Jan. 13, 1953 O. J. BURDEN 2,625,003
LIQUID DISPLAY CLOCK
Filed March 1, 1950
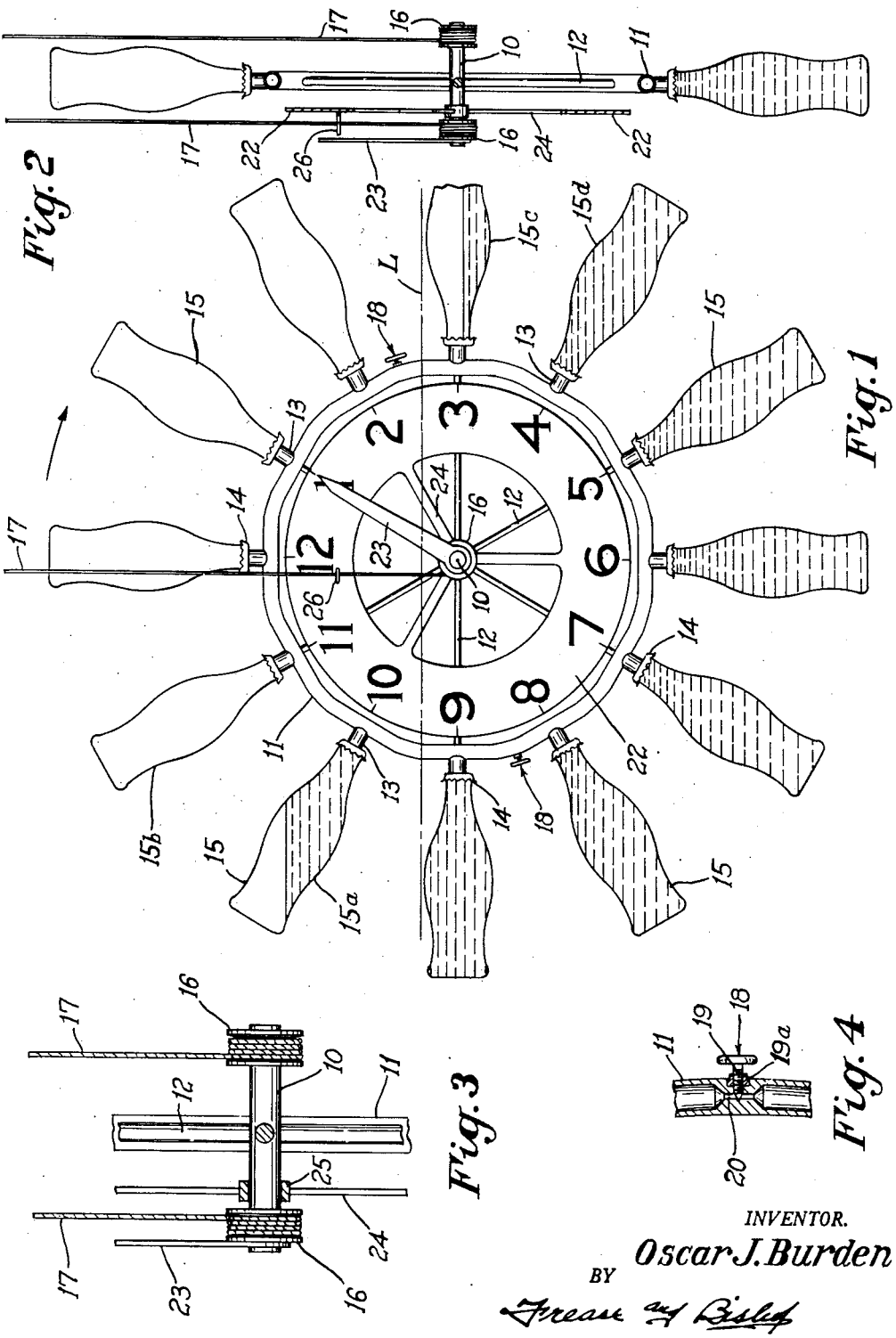
INVENTOR.
*Oscar J. Burden*
BY
*Frease and Bishop*
ATTORNEYS Patented Jan. 13, 1953

2,625,003

UNITED STATES PATENT OFFICE 2,625,003

LIQUID DISPLAY CLOCK

Oscar J. Burden, Alliance, Ohio, assignor of one-half to Glenn E. Burden, Alliance, Ohio Application March 1, 1950, Serial No. 147,063

7 Claims. (Cl. 58—2)

The invention relates generally to rotary fluid regulators, and more particularly to a rotary fluid device adapted to measure and indicate the passage of time.

Prior rotary fluid regulators known to me have contained the liquid entirely within a rotating drum or cylinder, so that the rotative force of the shifting liquid level due to gravity is applied through a relatively short radius. Moreover, in many of these prior devices the rotative force is used to govern or regulate the speed of rotation of a shaft which is driven by other motive power, and the effect of the rotative force cannot be varied or adjusted.

It is an object of the present invention to provide a novel rotary fluid device having a peripheral reservoir tube with a series of fluid compartments extending radially outward from the tube.

Another object is to provide a novel rotary fluid time regulator which is adapted to be rotated by its own weight over a relatively long period of time.

A further object is to provide a novel fluid time regulator wheel which is adapted to rotate in such manner as to accurately measure time.

Another object is to provide a novel rotary fluid wheel having indicating means for showing the passage of time.

A further object is to provide a novel rotary fluid wheel having a series of transparent liquid containers extending laterally outward from the wheel so as to make the constantly changing liquid level always visible.

A still further object is to provide a novel rotary fluid time indicator wheel having a peripheral reservoir tube and means for regulating the liquid flow through the tube so as to adjust the speed of rotation of the wheel for accurately indicating the passage of time.

These and other objects are accomplished by the parts, combinations and arrangements comprising the present invention, a preferred embodiment of which is shown in the accompanying drawing as exemplifying a preferred mode of carrying out the invention, the nature of the invention being stated in general terms in the following general statement and described in detail in the accompanying specification, and the scope of the invention being defined in the appended claims.

In general terms, the rotary fluid device of the present invention preferably includes a wheel having a hub and a peripheral liquid reservoir tube with flow regulating means therein, a series of bottles or the like communicating with said tube and extending laterally outward therefrom with liquid filling some of the bottles and part of the tube, there being a pulley fixed on the hub and a line wrapped around said pulley for applying rotative force thereto, and a time-indicating dial movably mounted on said wheel.

Referring to the drawing forming part thereof, in which a preferred embodiment of the invention is shown by way of example:

Figure 1 is a front elevational view showing the novel liquid clock in operation;

Fig. 2 is a vertical sectional view thereof;

Fig. 3 is an enlarged fragmentary view similar to Fig. 2; and

Fig. 4 is an enlarged fragmentary sectional view through one of the fluid regulating devices.

The novel liquid clock preferably comprises a wheel including a hub shaft 10 having a peripheral tube 11 supported on the shaft by means of radial spokes 12, the spokes being brazed or soldered or otherwise connected at their ends to the shaft 10 and the peripheral tube 11. The tube 11 may be circular or polygonal in form with any desired number of sides. The tube shown in Fig. 1 is 12 sided in form for representing the 12 hourly figures of a clock, but it will be understood that the tube may within the scope of the invention be made to have any number of sides.

At regular intervals around the tube 11 a series of pipe necks or conduits 13 are provided extending laterally outward from the tube and communicating therewith. Preferably the outer end of each conduit 13 has a crown cap 14 of usual construction mounted thereon, so that a glass bottle 15 can be secured to the crown cap by clamping the rim of the cap in usual fashion around the glass bead on the end of the bottle. The conduits 13 communicate through the caps with the interiors of the bottles 15, so that liquid in the tube 11 can flow into or out of the bottles.

The hub shaft 10 preferably has pulleys 16 secured on its outer ends, and these pulleys are preferably of a small diameter as shown. Each of the pulleys has a line or cord 17 fastened thereto and wrapped around the pulleys a number of times, so that if the wheel is suspended by the cords 17 the weight of wheel will tend to rotate the wheel by unwrapping the cords. The pulley diameters are made small so that the wheel will move downwardly only a slight amount during each rotation of the wheel.

It will be obvious that, if desired, the hub shaft 10 could be supported in suitable bearings and the wheel rotated by hanging weights on the cords 17 or by otherwise rotating the shaft. In this case the wheel would rotate about a fixed pivot, whereas with the shaft suspended by the cords 17, the wheel will move vertically downwardly as the cords 17 unwrap and rotate the wheel.

The means for regulating the speed of rotation of the wheel is a body of liquid filling part of the tube and certain of the bottles communicating therewith. Preferably, the liquid may be colored so as to be more readily visible through the bottles. As the wheel is rotated by the pulleys 16, the liquid level within the tube and bottles is shifted so as to unbalance the wheel, and the shifting of the liquid level allows the wheel to rotate at a speed in proportion to the time it requires for the liquid level to shift due to gravity, by flowing out of the bottles which have been rotated above the liquid level in the tube.

Referring to Figure 1, the tube 11 is first filled with liquid to approximately the liquid level line L, with the bottles below the liquid level full of liquid, the remaining bottles also being connected to their respective pipe necks 13 in tight sealing relation therewith.

Now, if the wheel is suspended by means of the cords 17 which are wrapped around the pulleys 16, the weight of the wheel will cause it to tend to rotate in a clockwise direction and unwrap the cords from the pulleys. However, since the wheel is unbalanced by the liquid in the bottles, as the wheel starts to rotate and carries one of the bottles 15a above the liquid level, the unbalance of the wheel slows down or substantially stops its rotation until some of the liquid in the bottle in position 15a flows out of the bottle into the tube.

The diameter of the pipe necks 13 must be of substantial size so that air can bypass liquid in the necks 13 as the liquid flows into or out of the bottles; otherwise the free flow of the liquid through the neck would be prevented. However, in order to regulate the flow of liquid into or out of the bottles and retard the flow so that it requires twelve hours for one rotation or one hour for the wheel to turn through 1/12 of a rotation, flow regulating means indicated generally at 18 is provided in the tube 11, preferably at diametrically opposite locations. The flow regulator means 18 may consist of an ordinary needle valve 19 mounted in a usual packing gland 19a and extending across a restricted orifice 20 in the tube so as to provide a very fine adjustment of the amount of liquid flowing through the tube. In this way, the rotation of the wheel may be adjusted accurately so as to cause it to make exactly one rotation every twelve hours.

As indicated in Fig. 1 the bottle in position 15a gradually empties its liquid, and as it is emptied, the shifting of the liquid level changes the balance of the wheel so that it gradually rotates clockwise and the bottle in position 15a rotates to position 15b by the time it is completely emptied. At the same time the bottle reaching the position 15c on the other side of the wheel below the liquid level begins to fill with liquid from the reservoir tube and as this bottle becomes filled, it gradually rotates to the position 15d where it is completely filled.

Accordingly, the wheel gradually rotates clockwise at a regulated speed of one rotation every twelve hours, during which time the cords 17 are gradually unwrapped on the pulleys 16 by the gravity pull of the wheel, and during rotation of the wheel, the liquid trickles out of the bottles as they rise above the original liquid level on the left side of the wheel and gradually trickles into the bottles on the right side of the wheel as they rotate below the liquid level in the reservoir tube 11. This constantly changing liquid level in the slowly rotating wheel is visible at all times through the glass bottles and provides an interesting, curious and attractive display if hung in a public show window or the like.

The time-indicating means may consist of a dail indicated at 22 which may be movably supported in suitable fashion in front of the spokes 12 so as not to rotate therewith, and which may be marked with the usual numerals 1 to 12 arranged at equal intervals around the dial, the numerals being preferably arranged one opposite each bottle. However, if a different number of bottles is used, the numbers may be arranged in any suitable fashion. A pointer or indicating hand 23 may be mounted on the outer end of the shaft 19 so as to turn with the shaft in front of the dial and cooperate with the numbers in indicating the passage of time. Preferably the pointer 23 is frictionally engaged on the shaft 19 so as normally to turn with the shaft, but such frictional engagement permits manual setting of the pointer to correspond to the correct time.

The dial 22 is preferably open at its central portion so that an observer can see that there is no mechanism behind the dial for turning the wheel. Perferably, the dial is journaled on the shaft 19 by means of spokes 24 supporting the dial on a journal 25 on the shaft. The means for preventing the dial 22 from rotating may include a loop or eye 26 which is secured to the dial and through which one of the cords 17 passes, so that the engagement of the cord with the loop 26 will prevent rotation of the dial. Obviously the loop 26 should be elongated sufficiently to allow the lateral movement of the cord 17 within the pulley groove.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A rotary fluid time indicator including a wheel having a hub shaft and a peripheral tube, a series of transparent containers connected to and communicating with the tube at intervals and extending radially outward therefrom, a body of liquid filling some of the transparent containers and part of the tube, and a restricted liquid timing orifice in said tube and a source of limited power for rotating the shaft at a rate corresponding to the flow of fluid through the timing orifice.

2. A rotary fluid time indicator including a wheel having a hub shaft and a peripheral tube, a series of transparent containers connected to and communicating with the tube at intervals and extending radially outwardly therefrom, a body of liquid filling some of the transparent containers and part of the tube, there being a timing orifice in the tube, limited power means for turning said shaft at a rate corresponding to the flow of liquid through the timing orifice, and means for varying the size of the timing orifice in said tube to regulate the speed of rotation of said wheel at a timed rate.

3. A rotary fluid time indicator including a wheel having a hub shaft and a peripheral tube, a series of bottles connected to and communicating with the tube at intervals and extending radially outward therefrom, a body of liquid filling some of the bottles and part of the tube, a restricted liquid timing orifice in the tube, a pulley fixed on said hub shaft, limited power means for turning said pulley for rotating the shaft at a rate corresponding to the flow of liquid through said restricted timing orifice, a dial jouralled relative to said wheel means preventing rotation of the dial, and a pointer on said hub shaft for cooperating with said dial.

4. A rotary fluid time indicator including a wheel having a hub shaft and a peripheral tube, a series of bottles connected to and communicating with the tube at intervals and extending radially outward therefrom, a body of liquid filling some of the bottles and part of the tube, a restricted liquid timing orifice in the tube, a pulley fixed on said hub shaft, a source of limited power including a line attached to and wrapped around said pulley for rotating the wheel at a rate corresponding to the flow of liquid through said timing orifice, a dial journaled on said shaft, and means on said dial slidably engaging said line for preventing rotation of said dial.

5. A rotary fluid time indicator including a wheel having a hub shaft and a peripheral tube, a series of bottles connected to and communicating with the tube at intervals and extending radially outward therefrom, a body of liquid filling some of the bottles and part of the tube, a restricted liquid passageway in said tube, means for varying the size of said passageway to regulate the speed of rotation of said wheel, means for rotating said wheel at a rate corresponding to the flow of liquid through said restricted passageway, a dial journaled on said shaft, and means preventing rotation thereof.

6. A rotary fluid time indicator including a wheel having a hub shaft and a peripheral tube, a series of bottles connected to and communicating with the tube at intervals and extending radially outward therefrom, a body of liquid filling some of the bottles and part of the tube, a restricted liquid passageway in said tube, means for varying the size of said passageway to regulate the speed of rotation of said wheel, a pulley fixed on said hub shaft, a source of limited power including a line wrapped around said pulley for rotating said wheel at a rate corresponding to the flow of liquid through said restricted passageway, a dial movably mounted on said wheel, and means on said dial slidably engaging said line for preventing rotation of said dial as the wheel rotates.

7. A rotary fluid time indicator including a wheel having a hub shaft, a peripheral tube on the wheel, spokes supporting said tube on said hub shaft, a series of bottles connected to and communicating with said tube at intervals and extending radially outward therefrom, a body of liquid filling some of the bottles and part of the tube, restricted passageways in opposite portions of said tube, valves for regulating the size of said passageways, pulleys on said shaft on opposite sides of said wheel, a source of limited power including lines wrapped around said pulleys for rotating the wheel at a rate corresponding to the flow of liquid through said restricted passageway, a dial movably mounted on said wheel, and means for preventing rotation of said dial.

OSCAR J. BURDEN.

REFERENCES CITED

The following references are of record in the file of this patent:

UNITED STATES PATENTS

| Number | Name | Date |
|---|---|---|
| 4,354 | Davis | Jan. 16, 1846 |
| 1,277,158 | Wall | Aug. 27, 1918 |

FOREIGN PATENTS

| Number | Country | Date |
|---|---|---|
| 1,555 | Great Britain | of 1860 |
| 25,775 | Switzerland | Mar. 21, 1903 |
| 379,638 | Germany | Aug. 25, 1923 |